US010091590B2

(12) United States Patent
Chen et al.

(10) Patent No.: US 10,091,590 B2
(45) Date of Patent: *Oct. 2, 2018

(54) HEARING AID DETECTION

(71) Applicant: Apple Inc., Cupertino, CA (US)

(72) Inventors: Shaohai Chen, Cupertino, CA (US);
Ching-Yu John Tam, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 283 days.

This patent is subject to a terminal disclaimer.

(21) Appl. No.: 14/747,903

(22) Filed: Jun. 23, 2015

(65) Prior Publication Data

US 2015/0296310 A1    Oct. 15, 2015

Related U.S. Application Data

(63) Continuation of application No. 13/196,770, filed on Aug. 2, 2011, now Pat. No. 9,065,929.

(51) Int. Cl.
*H04R 25/00* (2006.01)
*H04M 1/725* (2006.01)
*H04M 1/60* (2006.01)

(52) U.S. Cl.
CPC ........ *H04R 25/43* (2013.01); *H04M 1/72591* (2013.01); *H04R 25/554* (2013.01); *H04M 1/6016* (2013.01); *H04M 2250/12* (2013.01)

(58) Field of Classification Search
CPC ... H04R 25/43; H04R 25/554; H04M 1/6016; H04M 1/72591; H04M 2250/12

(Continued)

(56) References Cited

U.S. PATENT DOCUMENTS 7,162,381 B2 *   1/2007   Boor .................. H04R 25/502
                                                        381/312
7,486,386 B1 *   2/2009   Holcombe ............... G01C 3/08
                                                        356/4.01

(Continued)

FOREIGN PATENT DOCUMENTS

EP         2023652         2/2009
KR      20070070750        7/2007

OTHER PUBLICATIONS

Non-Final Office Action (dated May 21, 2014), U.S. Appl. No. 13/196,770, First Named Inventor: Shaohai Chen, (17 pages).

(Continued)

*Primary Examiner* — Davetta W Goins
*Assistant Examiner* — Daniel Sellers
(74) *Attorney, Agent, or Firm* — Womble Bond Dickinson (US) LLP

(57) ABSTRACT

A hearing aid compatible portable electronic audio device is configured to automatically determine whether or not the device is being used by a hearing impaired user who is wearing a hearing aid, and select a mode of operation based on this determination. The device includes a proximity sensor and a magnetic field sensor. The proximity sensor is used to detect a change in distance of the device to the user's ear. The magnetic field sensor is used to detect a change in magnetic field caused by the device moving relative to the hearing aid. The device selects between a normal audio mode of operation and a hearing aid compatible mode of operation based on both the change in detected distance and the change in detected magnetic field. Other embodiments are also described and claimed.

23 Claims, 4 Drawing Sheets

(58) Field of Classification Search
USPC ............................................... 381/315
See application file for complete search history.

(56) References Cited

U.S. PATENT DOCUMENTS

| | | | | |
|---|---|---|---|---|
| 7,634,098 | B2* | 12/2009 | Townsend | H04M 1/6016 381/312 |
| 7,728,316 | B2 | 6/2010 | Fadell et al. | |
| 8,326,385 | B2* | 12/2012 | Brogle | G01D 5/2405 455/522 |
| 2004/0125972 | A1* | 7/2004 | Boor | H04R 25/502 381/312 |
| 2005/1024402 | | 11/2005 | Muthuswamy et al. | |
| 2006/0133633 | A1 | 6/2006 | Hyvonen et al. | |
| 2007/0036373 | A1* | 2/2007 | Townsend | H04M 1/6016 381/312 |
| 2010/0128909 | A1* | 5/2010 | Bae | G01C 9/06 381/317 |
| 2010/0216402 | A1 | 8/2010 | Appleby et al. | |
| 2012/0051570 | A1* | 3/2012 | Arche | H04R 25/554 381/315 |

OTHER PUBLICATIONS

"Hearing Aid Compatibility for Wireless Telephones", FCC Consumer Facts, Federal Communications Commission, Consumer & Governmental Affairs Bureau, Washington DC, Internet document at: www.fcc.gov/cgb/consumerfacts/hac_wireless.html, (5 pages).

Roland, Patrick, "How Can I Choose the Best Phones for the Hard of Hearing?", wiseGEEK, Edited by R. Halprin, Last Modified: Jan. 14, 2011, Internet article at: http://www.wisegeek.com/how-can-i-choose-the-best-phones-for-the- . . . (2 pages).

* cited by examiner

HEARING AID DETECTION

This application is a continuation of co-pending U.S. application Ser. No. 13/196,770 filed on Aug. 2, 2011.

An embodiment of the invention relates to a portable audio device that detects the presence of a hearing aid and provides an output signal according to the presence or absence of the hearing aid. Other embodiments are also described.

BACKGROUND

Typically, someone who suffers from hearing loss wears a hearing assistive device, such as a hearing aid. Hearing aids are electro acoustical devices worn inside the ear to compensate for a hearing impairment by amplifying the local sound field. Generally, hearing aids operate in either a microphone mode or a telecoil mode. In the microphone mode, sound waves incident upon a microphone that is integrated in the hearing aid are converted to an electrical audio signal. In the telecoil mode, an induction coil (also referred to as a telecoil or T-coil) which may also be inside the hearing aid picks up the local magnetic field that has been modulated by the receiver (earpiece speaker) of a telephone handset. In either mode, the resultant electrical audio signal that has been picked up is subsequently processed, amplified and converted to sound (by a small speaker inside the hearing aid) that can be heard by the user.

Hearing aids do not always function well with some portable audio devices, such as mobile phones. One problem experienced when using a hearing aid in conjunction with a mobile phone is that the microphone inside the hearing aid may pick up unwanted ambient acoustic noise from the surrounding background environment, in addition to the desired speech coming from the mobile phone earpiece speaker (receiver), which makes it difficult for the user to discern the desired speech. However, when a hearing aid is switched to the T-coil mode, the hearing aid microphone may be deactivated, and the T-coil inductively couples the output audio signal (from a speaker in the mobile phone) to the hearing aid. As such, environmental or background acoustic noise is not amplified by the hearing aid when the T-coil is being used as a pick-up.

Hearing aid compatible (HAC) mobile phones are becoming more commonly available to the public. In addition to the typical acoustic receiver, HAC phones may also include a separate loop of wire (referred to as a telecoil or T-coil) for inductive coupling with the T-coil of a nearby hearing aid. Such phones are thus compatible with both the microphone of a hearing aid and its T-coil. These mobile phones traditionally include a selector switch that enables a user to manually select a HAC mode of operation. In that mode of operation, the audio processing applied to an audio signal may be modified to change the phone's audio frequency response so as to better accommodate the microphone of a hearing aid. Another change that may be made when the HAC mode has been selected is to allow the processed audio signal to drive a telecoil inside the mobile phone.

However, a user may find having to manually select the mode of operation of the mobile phone inconvenient and time consuming. For example, a user without a hearing impairment may wish to hand the mobile phone over to a person who is wearing a hearing aid, during an on-going call for instance. In this case, the user would need to manually select the HAC mode of operation before handing the phone over to the person wearing the hearing aid. Accordingly, automatic techniques for detecting the presence of a nearby hearing aid have been suggested.

SUMMARY

In an embodiment of the invention, a portable audio device is configured to automatically select between a normal mode of operation and a hearing aid compatible mode of operation, where the latter configures the audio device with one or more changes that improve its compatibility with a hearing aid during an audio session (e.g., a phone call). The device includes a proximity sensor having an emitter and a receiver, and a magnetic field sensor. The proximity sensor is used to detect a change in distance of the device to an ear of a user. The magnetic field sensor is used to detect a change in the local magnetic field that has been caused by the device moving relative to a hearing aid that is worn by the user. A data processor selects the mode of operation based on the change in distance detected using the proximity sensor and the change in the local magnetic field detected using the magnetic field sensor. For example, the processor may select the hearing aid compatible mode of operation when it detects a decrease in the distance of the device from the ear of the user and simultaneously detects an increase in magnetic field caused by the device moving toward the hearing aid. This simultaneous decrease in detected distance and increase in detected magnetic field indicates that the device is most likely moving towards an ear of a user who is wearing a hearing aid. On the other hand, the processor may select the normal mode of operation when it detects an increase in the distance of the device from the user's ear or when it detects a decrease in the magnetic field caused by the device moving away from the hearing aid. Thus, the device automatically switches between the two modes of operation without requiring the user to manually select the mode of operation each time the user wants to change between a normal mode and hearing aid compatible mode. To improve the certainty of the mode selection decision, motion data as provided by a position, orientation or movement sensor in the device can be analyzed to for instance detect a simultaneous change in orientation.

While in the hearing aid compliant (HAC) mode, the spectral content and/or overall strength (e.g., total power) of an audio content signal that is transmitted by the device may be adjusted, to better suit pick up by a hearing aid (rather than directly by the users ear.) The audio content may be transmitted either acoustically, by driving a speaker, or inductively by driving a telecoil. In one instance, the readings from the proximity sensor, magnetic field sensor and the position, orientation or movement sensor may be analyzed, to find that the device is moving away from the users ear but is not sufficiently far to be deemed a release from the HAC mode. In response to such a finding, the processor may signal an increase in the overall strength of the transmitted audio content signal, in order to maintain a desired inductive coupling with the T-coil of the hearing aid, or a desired acoustic coupling with the microphone of the hearing aid.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

Embodiments of the invention will now be described with reference to the drawings summarized below. The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Figure 1:
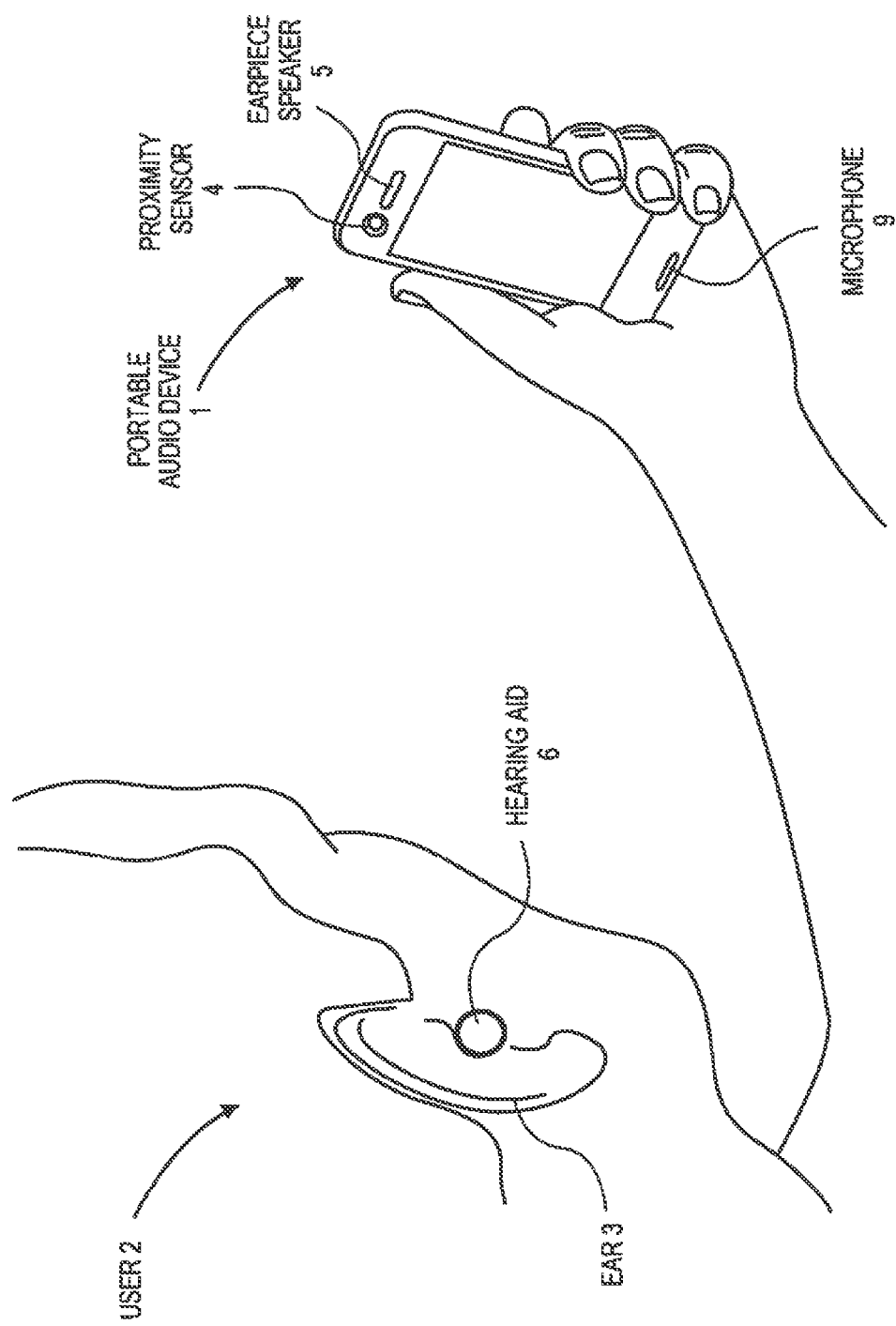
FIG. 1 illustrates a hearing impaired user holding an example audio device in his hand, namely a smart phone.
Figure 2:
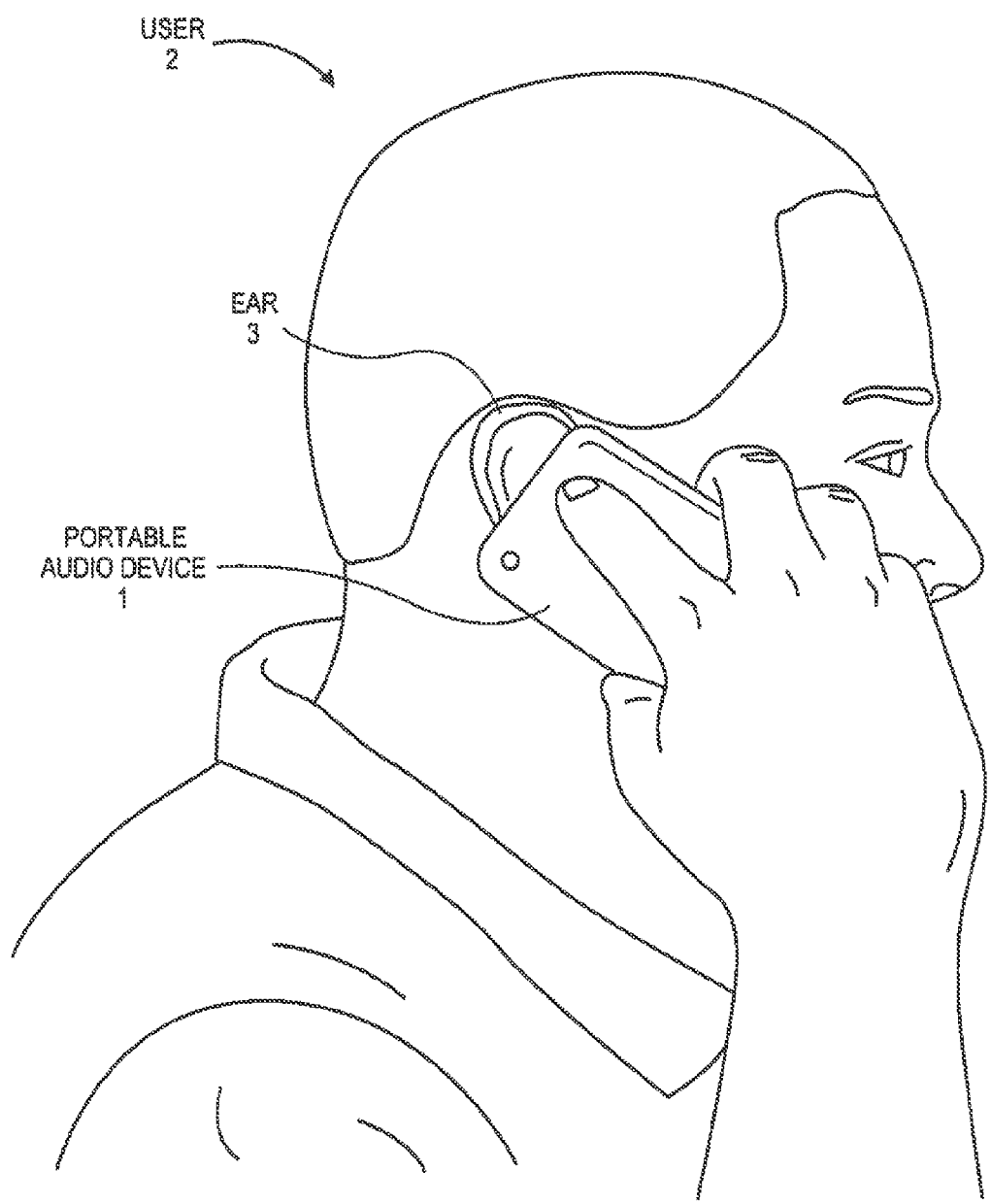
FIG. 2 illustrates a human user holding an example audio device against his ear.

FIG. 1 shows a portable audio device 1 being held by a user 2 in a manner that causes the device 1 to be in its normal audio mode of operation. The user 2 may be wearing a hearing aid 6 in his ear 3. FIG. 2 shows the user 2 holding the device 1 against his ear 3 (during a call). When the device 1 is being held in this manner by a user who is wearing a hearing aid, the device 1 automatically switches to a hearing aid compatible mode of operation. The device 1 may be any one of several different types of small consumer electronic devices that can be easily held in the user's hand and placed near the user's ear 3 during normal use. In particular, the device 1 may be a hearing aid compatible mobile device, such as a cellular phone, a smart phone, or a media player.

In the embodiment shown in FIG. 1 and FIG. 2, the device 1 may have an exterior front face in which there is a front-facing proximity sensor 4. The proximity sensor 4 may be placed next to an earpiece speaker or receiver 5 inside the housing of the device 1 and aimed in the same direction as the speaker 5. As will be explained below, the proximity sensor 4 may be used to detect a qualitative or quantitative measure of the distance of the device 1 from an external object that is interpreted to be the user's ear 3.

Figure 3:
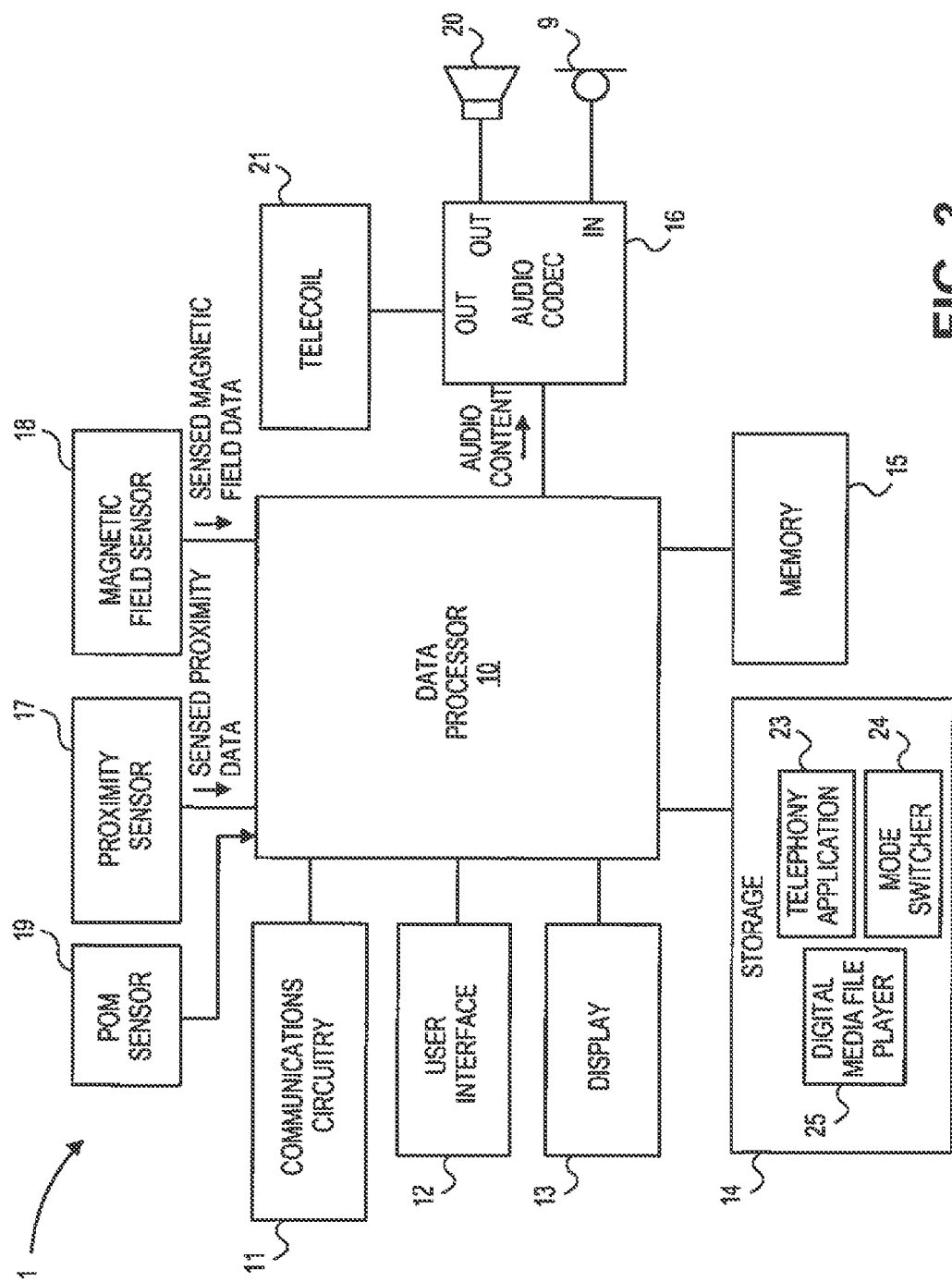
FIG. 3 is a block diagram of some of the relevant constituent components of an example audio device.

FIG. 3 is a block diagram of relevant electronic components in an example hearing aid compatible portable audio device 1. The device 1 may include a data processor 10 that interacts with communications circuitry 11, user interface 12, display 13, storage 14, memory 15, audio codec 16, proximity sensor 4, magnetic field sensor 18, and position, orientation or movement (POM) sensor 19. These components may be digitally interconnected and used or managed by a software stack being executed by the processor 10. Many of the components shown or described here may be implemented as one or more dedicated hardware units and/or a programmed processor (software being executed by a processor, e.g. the processor 10).

The processor 10 controls operation of the device 1 by executing one or more programs containing instructions for it (software code and data) that may be in the storage 14. The processor 10 may be an applications processor and may, for example, drive the display 13 and receive manual user inputs through the user interface 12 (e.g., a physical keypad or keyboard, or, alternatively, virtual keys that may be integrated with the display 13 as part of a single, touch sensitive display panel on the front face of the device 1). The processor 10 may also control the automatic switching between the normal audio mode of operation and the hearing aid compatible mode of operation.

Storage 14 provides a relatively large amount of "permanent" data storage, using nonvolatile solid state memory (e.g., flash storage) and/or a kinetic nonvolatile storage device (e.g., rotating magnetic disk drive). Storage 14 may store data and software components that control and manage, at a higher level, the different functions of the mobile device 1. For instance, in addition to an operating system, there may be a telephony application 23 that configures a built-in touch sensitive display to look like the keypad of a traditional telephony handset, and allows the user to enter a telephone number to be called, or select a previously stored number from a telephone address book. The telephony application then causes the needed call signaling to occur through a wireless or mobile communications network (e.g., a cellular terrestrial radio communications network), and enables a built-in microphone 9 and an earpiece speaker 20 (e.g., earpiece speaker 5—see FIG. 1) to be connected to the uplink and downlink audio signals of the call, to enable the user to participate in a two-way live or real-time conversation with a far-end user during the call. The telephony application 23 may also control the routing of the downlink audio signal to drive an integrated telecoil 21. An operation mode selection application or mode switcher 24 automatically switches from a normal audio mode of operation to a hearing aid compatible mode when it has interpreted the signals from the proximity and magnetic sensors to mean that a hearing impaired user has just placed the device 1 against his ear. The mode switcher 24 may interface with the telephony application 23 so that its processing of the sensor signals is triggered when the telephony application has been launched, brought to foreground from background, or when an outgoing call is initiated or an incoming call is answered. The mode switcher 24 may also interface with a digital media file player application 25 that can play back locally stored and/or Internet streaming digital sound files. In that case, the processing of the sensor signals may be triggered when the media player application is launched, brought to foreground from background, or when a sound file starts to play.

In addition to storage 14, there may be memory 15, also referred to as main memory or program memory, which provides relatively fast access to stored code and data that is being executed by the processor 10. Memory 15 may include solid state random access memory (RAM), e.g. static RAM or dynamic RAM. There may be one or more processors, e.g. the processor 10, that run or execute various software programs, modules, or sets of instructions (also referred to as software) that, while stored permanently in the storage 14, have been transferred to the memory 15 for execution, to perform the various functions described above. It should be noted that these modules or instructions need not be implemented as separate programs, but rather may be combined or otherwise rearranged in various combinations. In addition, the enablement of certain functions could be distributed amongst two or more modules, and perhaps in combination with certain hardwired logic.

The device 1 includes communications circuitry 11 which includes components that perform wireless communications for two-way real-time or live speech conversations and general data or file transfers. For example, communications circuitry 11 may include RF communications circuitry that is coupled to an antenna, so that the user of the device 1 can place or receive a call through a nearby wireless communications network base station. The RF communications circuitry may include a RF transceiver and a cellular baseband processor to process the digital downlink and uplink audio signals of the call through a cellular network. In another embodiment, communications circuitry 11 may include Wi-Fi communications circuitry so that the user of the device 1 may place or initiate a call using a voice over Internet Protocol (VOIP) connection, accessed through a wireless local area network.

As the device 1 moves, such as when it is shaken or tilted by its user, its position, orientation and/or movement (POM) sensor 19 may report continuous motion data, for instance as changes in linear acceleration (using an accelerometer) and/or turn rate (using a gyro.) This raw data may then be used to detect both the current orientation of the device (relative to the ground) and any instantaneous changes to that orientation. The operating system may permit an application, such as the mode switcher 24, to register so as to periodically receive raw data from the POM sensor 19, and/or notifications of predefined motion events (e.g., the start or stop of shaking.) As explained below, the mode switcher 24 may use this motion data to, for instance, improve the certainty of its decision that the device 1 is being held against a hearing aid.

The device 1 may include an audio codec 16 that contains audio processing circuitry that may perform as an analog/digital interface to the microphone 9, the speaker 20, and the telecoil 21. It may include analog amplifiers, analog signal conditioning circuitry, and analog to digital and digital to analog conversion circuitry that is needed for interfacing analog transducer signals with digital processing algorithms such as those running on the processor 10 that operate on a digital audio signal (also referred to here as the audio output signal or the audio content signal). The audio processing circuitry may also include programmable digital audio filters to perform signal conditioning upon the digital audio content in signal. The digital audio content in signal may be a downlink or uplink communications signal for a call, streaming audio from a remote server over the Internet, or locally stored digital audio being played back (e.g., a locally stored music or video file).

The audio codec 16 may include multiple audio signal processing modes including a normal use mode and a hearing aid compatibility (HAC) mode. In the normal mode, an audio out channel of the codec 16 that drives the speaker 20 is configured into a mode of operation in which the digital audio content signal is to be acoustically coupled with a human ear, through the speaker 20. In contrast, in the HAC mode, the codec 16 may be configured to perform a type of signal processing (upon the digital audio content signal or its analog form) that is intended to improve acoustic coupling with a microphone of a hearing aid. Selecting the HAC mode may also result in the codec 16 being configured to process the audio content signal so as to improve inductive coupling with a hearing aid T-coil; in that case, the output processed audio signal is provided to drive the telecoil 21—see FIG. 3.

For acoustic coupling in the normal audio mode, the audio codec 16 may be configured to process the audio content signal using a first set of equalization parameters which result in a frequency response that is suitable for acoustic coupling to a human ear (by driving the speaker 20). A suitable frequency response may have reduced energy in the middle frequency range and increased energy in the upper and lower frequency ranges, so that the output audio signal has a relatively flat frequency response over the voice band (i.e., over frequencies ranging from about 300 Hz to about 3.4 kHz). The desired audio signal conditioning, applied to the audio content signal, may be achieved using a programmable digital audio filter. The coefficients for configuring such a filter may be computed by the processor 10 and then passed to the audio codec 16, or they may have been predetermined and stored in the audio codec 16 as one of several programmable settings. Other ways of achieving the desired audio signal conditioning are possible, e.g., analog filters, For inductive coupling (in the HAC mode), the audio codec 16 may be configured to process the audio content signal using a second, different set of equalization parameters which result in a processed signal that will drive the telecoil 21. The second set of equalization parameters yield a frequency response that is suitable for inductive coupling to a hearing aid T-coil. A suitable frequency response may be one that results in signal energy being centered around the middle frequency range (e.g., around 1 kHz), as typically required for optimal coupling to a hearing aid T-coil.

The telecoil 21 of the device 1 produces a magnetic field of sufficient strength in the direction of the T-coil of the hearing aid 6 that is worn by the user 3. The telecoil 21 converts an electrical signal from the audio processor 16 that contains the audio content, into a magnetic signal that is picked up by a T-coil of the hearing aid 6. The telecoil 21 may be positioned in a suitable location in the device 1 so that it complies with the Hearing Aid Compatibility Act of 1988. For example, the telecoil 21 may be installed near the speaker 20 and in particular the earpiece speaker 5, to generate the magnetic field towards the user's hearing aid when the user places the device 1 against his ear.

The device 1 also includes a proximity sensor 17 that is used to detect the device's proximity to an object, such as a user's ear. The proximity sensor 17 may be positioned near the speaker 20 within the housing of the device 1 and aimed in the same direction as the speaker. The proximity sensor 17 may include a complementary emitter and detector pair, such as an infrared (IR) or supersonic emitter and detector pair, or other like sensor. In one embodiment, the proximity or distance of an external object relative to the device 1 can be represented by the strength of a coded signal from the emitter that has been reflected or scattered by the object and then picked up by the detector. The proximity sensor 17 may thus generate location data or movement data or both, which may be used by the processor 10 (e.g., while executing the mode switcher 24—see FIG. 3) to determine a measure or estimate of the distance of an object from the device 1. The applications processor 10 may continuously monitor the proximity of the device 1 to an object and may also be able to determine the type of object it is detecting. The light from the emitter may be emitted in square wave pulses which have a known frequency or code, thereby allowing the processor 10 to distinguish between ambient infrared light and light from the emitter which has been reflected by an object, such as the user's ear. If no object is present or the object is beyond a certain distance from the detector, an insufficient or small amount of emitted light is reflected back towards the detector, and this may be interpreted by the applications processor 10 to mean that an object is not present or is at a relatively large distance away from the device 1. When the detector detects an increase in light intensity of the reflected light, this may be interpreted by the applications processor 10 to mean an object is present within a short distance of the detector. In each case, the proximity sensor is being used to measure the intensity of reflected light which is related to the distance between the object which reflects the light and the detector in the device 1.

The device 1 also includes a magnetic field sensor 18 that measures the external magnetic field that is present in the immediate surroundings of the device 1. The magnetic field sensor 18 may be positioned near the speaker 20 within the housing of the device 1. The magnetic field sensor 18 should be sensitive enough to detect changes in the local magnetic field that have been caused by a hearing aid that is in close proximity to the device 1. The sensor 18 may include, for example, a Hall Effect sensor. The sensor 18 may also be used by other applications running in the device 1, such as an electronic digital compass. The magnetic field sensor 18 may be used to continuously monitor the magnetic field surrounding the device 1. The monitored magnetic field may include contributions from one or more magnetic components inside device 1 that are near the magnetic field sensor 18, such as the magnet of the speaker 20. The monitored magnetic field may also have a contribution from one or more external magnetic objects or field sources, i.e. found in the external environment close to the device 1, such as when the user places the device 1 near a hearing aid that is inside his ear. Accordingly, some type of hearing aid detection calibration procedure may be needed to remove, from the "raw" magnetic field signal being monitored, the effects of interference by certain components and nearby field sources, so as to isolate the magnetic field signal that is caused by the hearing aid.

The proximity data from the proximity sensor 17 and the magnetic field data from the magnetic field sensor 18 may be used to determine the device's location relative to a hearing aid that is inside a user's ear. Changes in the monitored (detected) proximity may be computed, and then compared with computed changes in the monitored magnetic field, to determine when the user 2 has placed the device 1 against his ear 3. Based on having detected such changes regarding the device's location and the magnetic field, the processor 10 may then select an audio mode of operation of the device 1. The audio codec 16 may then adjust the frequency response of a filter to which an audio content signal is input, according to the audio mode of operation that is selected by the processor 10, and provides adjusted or processed audio content signals to the speaker 20, the telecoil 21, or both. Alternatively or additionally, the device 1 may be configured to respond to the selected mode of operation by adjusting other signals that are output by the device 1. For example, the communications circuitry 11 may be configured to adjust its radio frequency (RF) emissions depending on the selected audio mode of operation. In the hearing aid compatible mode, the RF emissions may be lowered so that the hearing aid will be less likely to be affected by RF interference.

As explained above, while in the hearing aid compliant (HAC) mode, the spectral content and/or overall strength (e.g., total power) of an audio content signal that is transmitted by the device may be adjusted, to better suit pick up by a hearing aid (rather than by the users naked ear.) The audio content may be transmitted either acoustically by driving the speaker 20, or inductively by driving the telecoil 21 (see FIG. 3). In one instance, the readings from the proximity sensor 17, magnetic field sensor 18 and the POM sensor 19 may be analyzed by the mode switcher 24, to find that the device 1 is moving away from the users ear but is not sufficiently far to justify a release from the HAC mode. In response to such a finding, the mode switcher 24 may signal an the audio codec 16 to increase the overall strength of the transmitted audio content signal, in order to maintain a desired inductive coupling with the T-coil of the hearing aid, or a desired acoustic coupling with the microphone of the hearing aid.

Note that the magnetic and proximity sensors may produce analog output signals that can vary continuously or substantially continuously, rather than being discrete values, which have quantum, discrete jumps from one value to the next value. For example, the proximity sensor 17 may determine or provide data that represents a distance which can vary continuously or nearly continuously in an analog fashion. In the case of such a proximity sensor, the distance may correspond to the intensity of reflected light which originated from the emitter of the proximity sensor. The magnetic field sensor 18 may determine or provide data that represents a measurement of the magnetic field that is present around the device 1, which may be an analog value. Such analog signals may be sampled e.g., under control of the processor 10, at a predetermined frequency that is sufficiently high in order to determine that the user has moved the device 1 and placed it against his ear. For example, the change in distance and the change in magnetic field resulting from the user's movements may have a frequency content of less than 20 hertz. The processor 10 may thus sample output values from the sensors at a frequency of at least 40 hertz (the Nyquist rate of 20 hertz). Other sample rates are, of course, possible.

Figure 4:
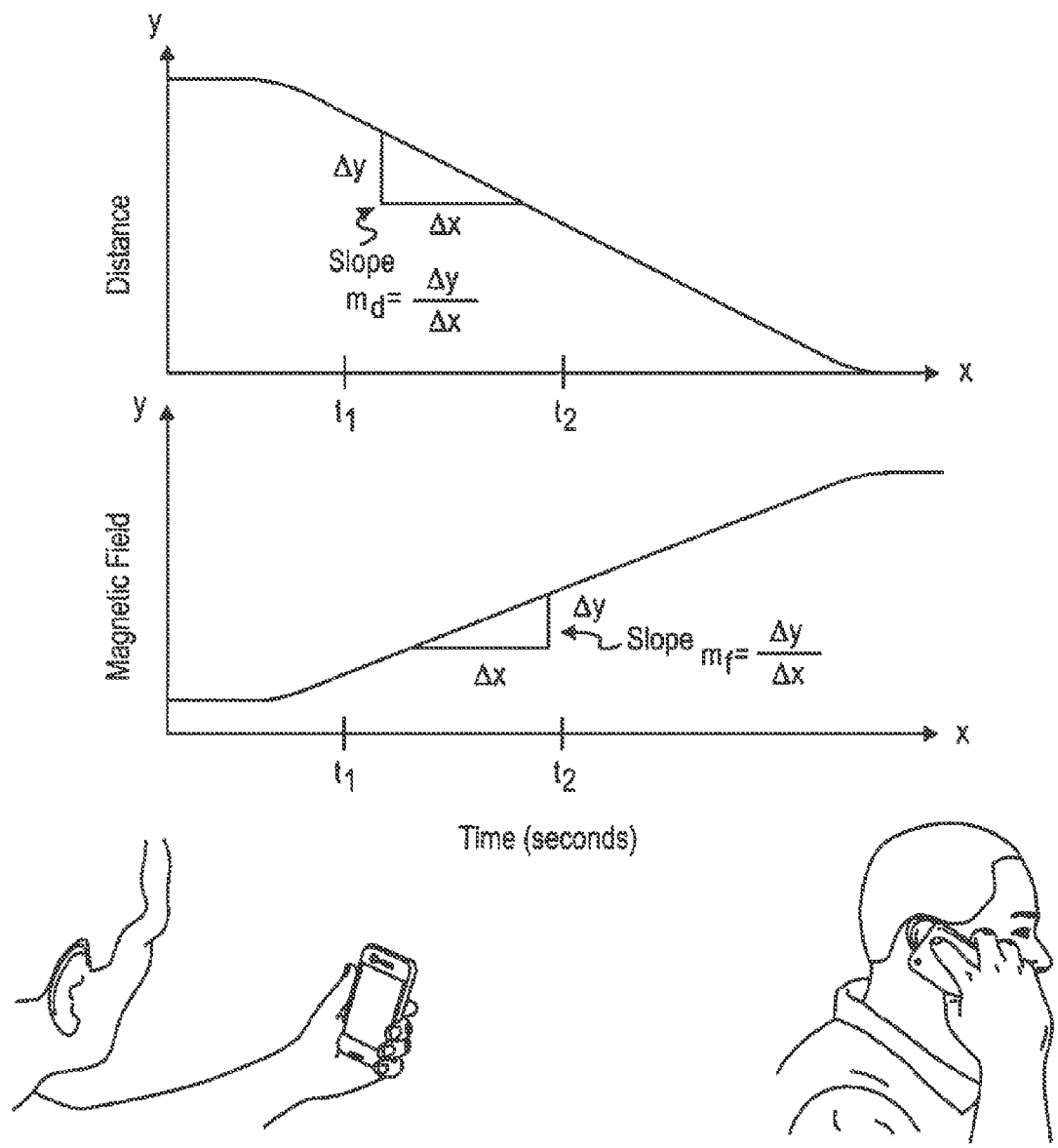
FIG. 4 shows graphs of detected proximity data and detected magnetic field data versus time, as a hearing impaired user moves an audio device towards his ear.

FIG. 4 shows example graphs of smoothed (filtered) proximity data and magnetic field data versus time, which coincide with a hearing impaired user moving the device to his ear. As shown in FIG. 4, at time zero when the user is holding the device away from his ear (e.g., to look at the display), the proximity data indicates that the device 1 is far from an object, and the magnetic field data indicates that the magnetic field surrounding the device is low. As the user then moves the device 1 towards his car, the proximity data indicates that the distance of the device 1 from an object is decreasing. Meanwhile, the detected magnetic field data is simultaneously increasing, due to the magnetic field sensor sensing that the device is moving closer to a particular type of external field source (i.e., a hearing aid). When the detected distance is decreasing at a given rate (slope) and the detected magnetic field data is simultaneously increasing at a given rate (slope), the device 1 may be switched to a hearing aid compatible mode of operation, so that it can be used more effectively by the hearing impaired user. The period of time in which the changes to the distance and magnetic field data (e.g., slopes) may be computed are indicted in this case as being between $t_1$ and $t_2$.

The following are operations performed by the personal audio device 1 to automatically select between a normal mode of operation and a hearing aid compatible mode of operation. The proximity sensor 17 is used to monitor the distance of the device 1 from an object, and the magnetic field sensor 18 is used to simultaneously monitor the magnetic field level (of an external field source). The proximity sensor 17, the magnetic field sensor 18, and the POM sensor 19 may be continuously obtaining measurements while the device is powered on and active (i.e., not in sleep mode). The mode switcher 24 may be triggered to begin analyzing sensor data when the telephony application 23, the digital media file player 25, or other audio application is running in the device 1 (see FIG. 3). As another alternative, the monitoring of distance, magnetic field, and POM data may begin when the operating system determines that the device 1 has started to move or change its orientation (using, for example, motion data or motion events from the POM sensor 19 that is integrated in the device 1).

The proximity sensor 17 may transmit a proximity signal that indicates the distance of the device 1 from an object, e.g. the user's ear, to the processor 10. By monitoring the proximity signal, the processor 10 can compute a change in the distance of the device 1 from the user's ear. This may be, for example, part of computing a slope $m_d$ in FIG. 4. The magnetic field sensor 18 may transmit a magnetic field signal that indicates the measured magnetic field to the processor 10. By monitoring the magnetic field signal, the processor 10 can compute a change in the magnetic field around the device 1, e.g. as part of a slope $m_r$, in FIG. 4. When the processor 10 detects a significant change in the distance and/or a significant change in the magnetic field, namely larger than predetermined thresholds, the processor 10 selects a mode of operation of the device based on the detected change in distance and/or the detected change in the magnetic field. The certainty of this decision, i.e., to select between the different modes of operation, may be improved by the mode switcher 24 analyzing the raw POM data and/or motion events that are occurring during the same period of time $t_1$ to $t_2$. The processor 10 then transmits an operation mode signal to the audio codec 16 that indicates the selected mode of operation. The audio codec 16 then processes the input audio content signal that is to be provided to the user according to the selected mode of operation. The audio codec 16 provides the processed audio signal to speaker 20, the telecoil 21, or both.

The following is an example illustrating a decision process that the processor 10 may utilize to select a mode of operation. The processor 10 (while running the mode switcher 24) may monitor the proximity signal to compute a change in distance of the device 1 from the user's ear over a given time interval. This may be the slope $m_d$ in FIG. 4, computed somewhere in the period of time between $t_1$ and $t_2$. While the processor 10 does not detect a significant change in distance, the process ends, the device 1 remains in its current mode of operation. The mode switcher 24 may also have been monitoring POM data and/or motion events over the same time interval, to find that the device 1 has essentially not moved or changed orientation—that finding would add certainty to the decision to maintain the current mode of operation.

When the processor 10 detects a significant change in the distance of the device 1 from the external object, the processor 10 determines whether the distance has increased or decreased. An increase in the distance may indicate that the user has moved the device 1 away from his ear. In other words, the user is no longer holding the device 1 against his ear, and thus the device 1 may not need to be in a hearing aid compatible mode of operation. If the processor 10 detects this increase in the distance of the device 1 from the user's ear, the processor 10 may select a normal mode of operation. The mode switcher 24 may also have been monitoring POM data and/or motion events over the same time interval, to find that the device 1 has suddenly changed from a substantially vertical orientation to a substantially horizontal one. That finding would add certainty to the decision that the device 1 is no longer being held against the ear, such that a change in the mode of operation is warranted.

On the other hand, a decrease in the distance may indicate that the user has moved the device 1 towards his ear. This is depicted in FIG. 4 where the slope $m_d$ is negative in value.

If the processor 10 detects such a decrease in the distance, the processor 10 may analyze the magnetic field signal (e.g., within the same period of time from $t_1$ to $t_2$) to determine whether the contribution from an external magnetic field source (expected to be outside the device 1) has sufficiently increased, e.g. over the same period of time that the distance has decreased. This is depicted in FIG. 4 where the slope $m_r$, is positive in value. An increase in the magnetic field (or positive slope) that occurs simultaneously with a decrease in the distance (or negative slope, as in FIG. 4) may indicate that a user who is wearing a hearing aid has moved the device 1 towards his ear. If the processor 10 computes such a result then it may select a hearing aid compatible mode of operation. Otherwise, if the processor 10 detects either no change or a decrease in the contribution from the external magnetic field source, this may indicate that the user is not wearing a hearing aid or is moving the device 1 away from his hearing aid. In this case, the processor 10 may select the normal mode of operation. Note that while analyzing the magnetic field signal, the mode switcher 24 may also have been monitoring POM data and/or motion events over the same time interval, to find that the device 1 has suddenly changed to a substantially vertical orientation. Such a finding would add certainty to the decision that the device 1 has just been moved to the-at-the-ear position, such that a change to the HAC mode of operation is warranted.

Note that the above decision process may be triggered by the processor 10 detecting an initial change in the proximity or distance of the device 1 from an object. Alternatively, or in addition, the decision process may be triggered when the processor 10 detects an initial change in an external magnetic field contribution, or an initial significant and sudden change in orientation (as found through analysis of POM data and/or motion events.) In such cases, the decision process may then continue with the processor 10 detecting that the distance is decreasing while the magnetic field is increasing, in which case it may then select a hearing aid compatible mode of operation. Otherwise, the processor 10 may select a normal mode of operation. Once again, the certainty of the decision process here may be improved based on analysis of POM data and/or motions events that are occurring in the same time interval as the changes in proximity and magnetic field data.

While monitoring the proximity signal and the magnetic field signal, the processor 10 (while executing the mode switcher 24—see FIG. 3) may perform some signal conditioning on the proximity signal, the magnetic field signal, or both, prior to computing the changes in distance or magnetic field (or their respective slopes). The processor 10 may filter the raw signals from these sensors to, for instance, remove noise. For example, the processor 10 may filter the magnetic field signal in accordance with the audio content signal that is driving the speaker, in order to remove changes in the signal that are due to interference from the speaker 20. Also, the processor 10 may be configured to respond to certain patterns of changes and/or certain spectral content, in the distance and the magnetic field signals, in order to isolate or interpret the relevant data. For example, the expected change in distance and change in magnetic field resulting from the user's movements may have a frequency or bandwidth of less than 20 hertz. The processor 10 may thus be configured to respond to changes in the distance and the magnetic field that occur at frequencies of 20 hertz or less, and ignore changes in the distance and the magnetic field that occur at frequencies greater than 20 hertz. This may be achieved by passing the raw sensor signals through a digital low pass filter having a 20 hertz cutoff frequency.

Embodiments of the invention may include various operations as set forth above or fewer operations or more operations or operations in an order that is different from the order described. The operations may be represented in machine-executable instructions that cause a general-purpose or special-purpose processor to perform these operations. That is, the techniques may be carried out in a computer system or other data processing system in response to its processor, such as a microprocessor, executing sequences of instructions. Such a computer program may be stored or transmitted in a machine-readable medium. A machine-readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media such as, but not limited to, a machine-readable storage medium (e.g., CD-ROMs, magnetic-optical disks, random access memories (RAMs), flash memory, or any type of media suitable for storing electronic instructions), or a machine-readable transmission medium such as, but not limited to, any type of electrical, optical, acoustical or other form of propagated signals (e.g., carrier waves, infrared signals, digital signals, etc.).

Alternatively, the operations may be performed by specific hardware components that contain hardwired logic for performing the operations, or by any combination of programmed computer components and custom hardware components. Thus, the techniques are not limited to any specific combination of hardware circuitry and software or to any particular source for the instructions executed by the data processing system. In addition, throughout this description, various functions and operations are described as being performed by or caused by software code to simplify description. However, those skilled in the art will recognize that what is meant by such expressions is that the functions result from execution of code by a processor, such as a microprocessor.

For purposes of explanation, specific embodiments were described to provide a thorough understanding of the present invention. These should not be construed as limiting the scope of the invention but merely as illustrating different examples and aspects of the invention. It should be appreciated that the scope of the invention includes other embodiments not discussed in detail above. Various other modifications, changes, and variations which will be apparent to those skilled in the art may be made in the arrangement, operation, and details of the apparatus and methods of the present invention disclosed herein without departing from the spirit and scope of the invention as defined in the appended claims. For instance, the hearing aid compatible device is depicted in FIG. 1 and FIG. 2 as a mobile device; however, it may alternatively be a hearing aid compatible headset, which may be on that is wirelessly connected to the mobile device or on that is plugged in via cable to an earphone jack of the mobile device. Therefore, the scope of the invention should be determined by the claims and their legal equivalents. Such equivalents include both currently known equivalents as well as equivalents developed in the future, i.e. any elements developed that perform the same function, regardless of structure.

What is claimed is:

1. A portable audio device suitable for use with a hearing aid, comprising:
   a proximity sensor to detect a measure of distance of the device to an external object;
   a magnetic field sensor to detect a measure of external magnetic field;
   data processing circuitry coupled to the proximity sensor and the magnetic field sensor to compute a change in the distance to the external object and a change in the external magnetic field, over a same time interval, and then select between a normal audio mode of operation and a hearing aid compatible mode of operation, based on the computed changes in distance and magnetic field occurring over the same time interval;
   audio processing circuitry having storage in which an audio application program is stored, and a processor to execute the audio application program so as to generate an audio output signal being one of a downlink communications signal for a call, a streaming audio signal from a remote server, or locally stored digital audio being played back, wherein the audio processing circuitry is to process the audio output signal according to the selected mode of operation; and
   a speaker coupled to receive the processed audio output signal.

2. The portable audio device of claim 1, further comprising:
   a telecoil coupled to receive the processed audio output signal.

3. The portable audio device of claim 1, wherein in the normal audio mode different audio equalization parameters are applied to process the audio output signal by the audio processing circuitry than in the hearing aid compatible mode.

4. The portable audio device of claim 1, wherein the data processing circuitry is to detect a decrease in distance of the device to the external object, and an increase in the external magnetic field, over the same time interval, and the data processing circuitry is to select the hearing aid compatible mode in response to the detected decrease in distance and the detected increase in magnetic field occurring over the same time interval.

5. The portable audio device of claim 4, further comprising a position orientation or movement (POM) sensor, wherein the data processing circuitry is to monitor data from the POM sensor, over the same time interval in which the increase in magnetic field and decrease in distance are detected, to detect that the device has changed orientation, and to select the hearing aid compatible mode in response to the detected orientation change.

6. The portable audio device of claim 1, wherein when the data processing circuitry detects a decrease in magnetic field simultaneous with a detected increase in distance, the data processing circuitry is to select the normal audio mode in response to both the detected decrease in magnetic field and the detected increase in distance.

7. The portable audio device of claim 6, further comprising a position orientation or movement (POM) sensor, wherein the data processing circuitry is to monitor data from the POM sensor, over the same time interval in which the decrease in magnetic field and increase in distance are detected, to detect that the device has changed orientation, and to select the normal audio mode in response to the detected orientation change.

8. The portable audio device of claim 1, wherein the speaker is a receiver integrated in a mobile phone handset housing and wherein the proximity sensor is positioned next to the speaker and aimed in the same direction as the speaker.

9. The portable audio device of claim 1, wherein the data processing circuitry is to detect an increase in distance of the device to an external object, the data processing circuitry to select the normal audio mode in response to the detected increase in distance.

10. A method performed in a portable audio device, comprising:
    generating an audio output signal being one of a downlink communications signal for a call, a streaming audio signal from a remote server, or locally stored digital audio being played back, by a processor in the device executing an audio application program that is stored in the device;
    detecting a change in distance of the device to an external object, by processing a proximity sensor signal over a period of time;
    detecting a change in an external magnetic field, by processing a magnetic field sensor signal over the period of time; and
    selecting between a normal audio mode of operation and a hearing aid compatible mode of operation based on the detected change in distance and the detected change in magnetic field over the period of time,
    wherein the audio output signal is generated differently according to the selected mode of operation.

11. The method of claim 10, wherein the audio output signal is an audio signal that drives a speaker, the method further comprising:
    filtering a magnetic field sensor signal in accordance with the audio signal to remove interference from the speaker.

12. The method of claim 10, wherein selecting the mode of operation comprises:
    selecting the hearing aid compatible mode in response to simultaneously detecting an increase in magnetic field and a decrease in distance over the period of time.

13. The method of claim 12, wherein the audio output signal is generated for driving a speaker for acoustic coupling to a microphone of a hearing aid.

14. The method of claim 12, wherein the audio output signal is generated for driving a telecoil for inductive coupling to a telecoil of a hearing aid.

15. The method of claim 12 further comprising detecting a change in orientation of the device, and wherein selecting the mode of operation comprises selecting the hearing aid compatible mode in response to detecting the change in orientation in the period of time.

16. The method of claim 10, wherein selecting the mode of operation comprises:
    selecting the normal audio mode in response to simultaneously detecting a decrease in magnetic field and an increase in distance to the external object, wherein the detected decrease and the detected increase have a bandwidth less than twenty (20) hertz.

17. The method of claim 16, wherein the audio output signal is for driving a speaker for acoustic coupling to a human ear.

18. The method of claim 16 further comprising detecting a change in orientation of the device in the period of time, and wherein selecting the mode of operation comprises selecting the hearing the normal audio mode in response to simultaneously detecting that the device has change orientation.

19. An article of manufacture, comprising:
    a non-transitory machine-readable storage medium having stored therein instructions that program a processor, the processor being a component of a portable audio device, to a) receive magnetic field data from a magnetic field sensor and proximity data from a proximity sensor, b) compute a distance change from the proximity data and a magnetic field change from the magnetic field data over a same time interval, and c) select between a normal audio mode of operation and a hearing aid compatible (HAC) mode of operation based on the computed changes occurring over the same time interval, and
    wherein the storage medium has further stored therein an audio application program that programs the processor to generate an audio output signal being one of a downlink communications signal for a call, a streaming audio signal from a remote server, or locally stored digital audio being played back, wherein the audio output signal is generated according to the selected normal audio or hearing aid compatible mode of operation.

20. The article of manufacture of claim 19, wherein the processor is to select the HAC mode of operation in response to determining that the device has been placed against an ear of a user with a hearing aid therein, based on having computed a simultaneous increase in magnetic field and decrease in distance, and wherein in the HAC mode the audio output signal is adapted for one of acoustic coupling to a microphone of a hearing aid or inductive coupling to a T-coil of a hearing aid.

21. The article of manufacture of claim 20, wherein the storage medium has stored therein further instructions that program the processor to receive motion data from a position, orientation or movement sensor, and analyze the received proximity, magnetic field and motion data to find that the device is moving away from the user's ear but is not sufficiently far to signal a release from the HAC mode, and in response signal an increase in strength of the audio output signal.

22. The article of manufacture of claim 21, wherein the processor is to select the normal audio mode of operation in response to determining that the device has been moved away from the ear of the user with the hearing aid therein based on having computed a simultaneous decrease in magnetic field and an increase in distance and wherein the in the normal audio mode the audio output signal is adapted for acoustic coupling to a human ear.

23. The article of manufacture of claim 20, wherein the processor is to select the normal audio mode of operation in response to determining that the device has been moved away from the ear of the user with the hearing aid therein based on having computed a simultaneous decrease in magnetic field and an increase in distance and wherein in the normal audio mode the audio output signal is adapted for acoustic coupling to a human ear.

* * * * *